United States Patent

Matsuura et al.

[11] Patent Number: 5,395,293
[45] Date of Patent: Mar. 7, 1995

[54] SPEED CHANGE CONTROLLER FOR VEHICLE

[75] Inventors: Masaaki Matsuura, Tokyo; Kunihiko Tanaka; Masahiro Kuroki, both of Saitama; Seiji Onozawa, Tokyo, all of Japan

[73] Assignee: Honda Giken Kogyo Kabushiki Kaisha, Tokyo, Japan

[21] Appl. No.: 70,284

[22] Filed: Jun. 2, 1993

[30] Foreign Application Priority Data

Jun. 2, 1992 [JP] Japan .................. 4-141732

[51] Int. Cl.⁶ .......................... B60K 41/00
[52] U.S. Cl. ......................... 477/15; 477/20
[58] Field of Search ............... 477/15, 20, 109

[56] References Cited

U.S. PATENT DOCUMENTS

| | | | |
|---|---|---|---|
| 4,256,196 | 3/1981 | Waddington | 477/15 |
| 4,887,490 | 12/1989 | Russ | 477/15 |
| 5,184,577 | 2/1993 | Kato et al. | 477/109 |
| 5,211,680 | 5/1993 | Sumimoto et al. | 477/109 |
| 5,242,039 | 9/1993 | Mabee | 477/20 |
| 5,272,632 | 12/1993 | Noguchi et al. | 477/15 |
| 5,287,772 | 2/1994 | Aoki et al. | 477/20 |

FOREIGN PATENT DOCUMENTS 61-81043 5/1985 Japan .

Primary Examiner—Edward K. Look
Assistant Examiner—Mark Sgantzos

[57] ABSTRACT

To smoothly perform a shift change by the actuator with a simple structure, a drive motor M as a running drive source is connected with a drive motor electronic motor unit 103 through a FET driver 107. A change motor 61 for driving a shift drum 62 is connected with a change motor electronic control unit 111 through a FET driver 112. When a drive motor electronic control unit 103 outputs the speed change signal on the basis of the detection signal of an accelerator opening sensor 106 and a drive motor rotational speed sensor 104, the output of the driver motor M is temporarily reduced or stopped to release the meshing surface pressure of the gear trains of the transmission T, and during the period thereof, a shift drum 62 is driven by the change motor 61 for performing the shift change. After completion of the shift change, the output of the drive motor M is smoothly increased.

22 Claims, 10 Drawing Sheets

SPEED CHANGE CONTROLLER FOR VEHICLE

BACKGROUND OF THE INVENTION

1. Field of the Invention

The present invention relates to a speed change controller for a vehicle, and particularly a speed change controller for a vehicle which performs the shift change by the driving force of an actuator without using a shift pedal.

2. Description of Background Art

In a speed change gear generally used in a motorcycle, motorized bicycle or the like, the movement of a foot-operated type shift pedal is transmitted to a shift drum through a ratchet mechanism, to selectively operate a plurality of shift forks which are cam engaged with the shift drum and intermittently rotated for performing the shift change.

In an electric speed change gear without the shift pedal, there is known a technique wherein a shift drum is rotated by a motor operated on the basis of a speed change command signal outputted from a shift switch, for example, as disclosed in Japanese Utility Model Laid-open No. S61-81043.

In a shift drum drive mechanism using a foot-operated type shift pedal, even when the gear of the transmission is not smoothly engaged, the shift change is finally completed by repeating the shift operation. However, in the electric speed change gear, a complex control is required for suitably performing the gear engagement operation in the shift change.

SUMMARY AND OBJECTS OF THE INVENTION

Taking the above circumstances into consideration, the present invention permits a smooth shift change by the actuator with a simple structure.

To solve the above problem, according to the present invention, there is provided a speed change controller for a vehicle which transmits an output of a running drive source to a drive wheel through a transmission, comprising: a speed change signal outputting means for outputting a speed change signal; an output reducing means for reducing or stopping an output of the running drive source on the basis of the speed change signal; an actuator for speed-changing the transmission during reducing or stopping the output of the running drive source; and an output increasing means for increasing the output of the running drive source after completion of the speed change.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
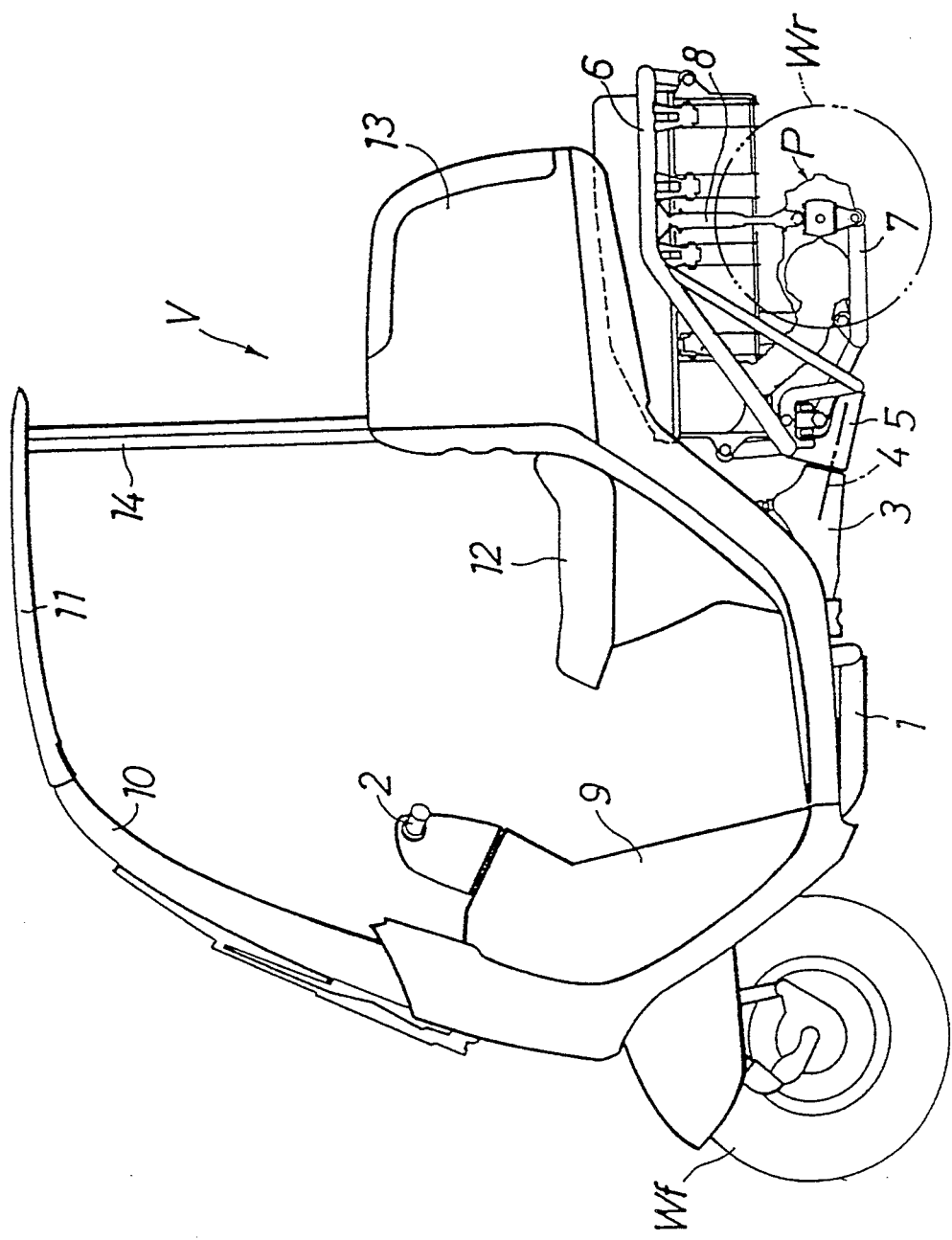
FIG. 1 is a side view showing the construction of a cycle vehicle.

As shown in FIG. 1, an electric cycle vehicle V includes a front vehicular frame 1 constructed of welded steel pipes, and a front wheel Wf operated by a handle 2 supported on the front side thereof. A rear vehicular bracket 5 is rotatably supported in the right and left directions, on a front vehicular bracket 3 provided on the rear portion of the front vehicular frame 1 through a swing shaft 4 disposed so as to be slightly ascended forward along the longitudinal direction of the vehicular body. A steel pipe forming a first rear vehicular frame 6 includes a front end which is rigidly fixed at the rear vehicular bracket 5. A power unit P having a pair of right and left rear wheels Wr is mounted on a steel pipe which forms the second rear vehicular frame 7 which is supported on the first vehicular frame 6 so as to be freely oscillated up and down. The first rear vehicular frame 6 is connected with the second rear vehicular frame 7 by means of a pair of right and left rear absorbers 8.

Accordingly, during turning of the cycle vehicle V, the front vehicular frame 1 can be oscillated to the right and left with respect to the first rear vehicular frame 6 and the second rear vehicular frame 7. In addition, the second rear vehicular frame 7 can be oscillated up and down with respect to the first rear vehicular frame 6.

A window shield 10 and a roof 11, for shielding a driver from wind, rain and direct sunlight, are connected to the front portion of a synthetic resin made body 9 covering the front vehicular frame 1. The rear end of the roof 11 is supported on the upper end of a column 14 erected between a seat 12 and a trunk 13.

Figure 2:
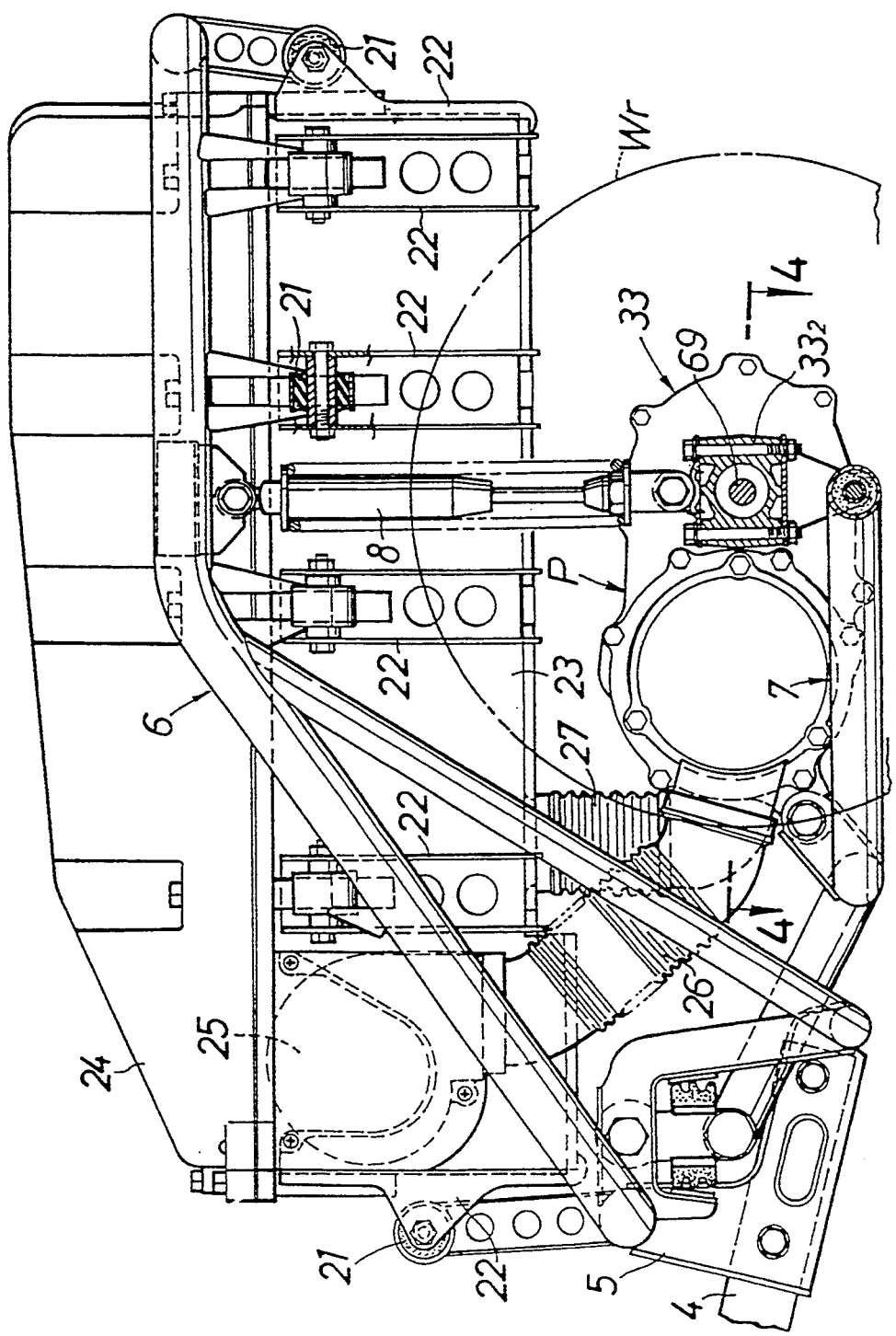
FIG. 2 is a side view of a rear vehicular body.
Figure 4:
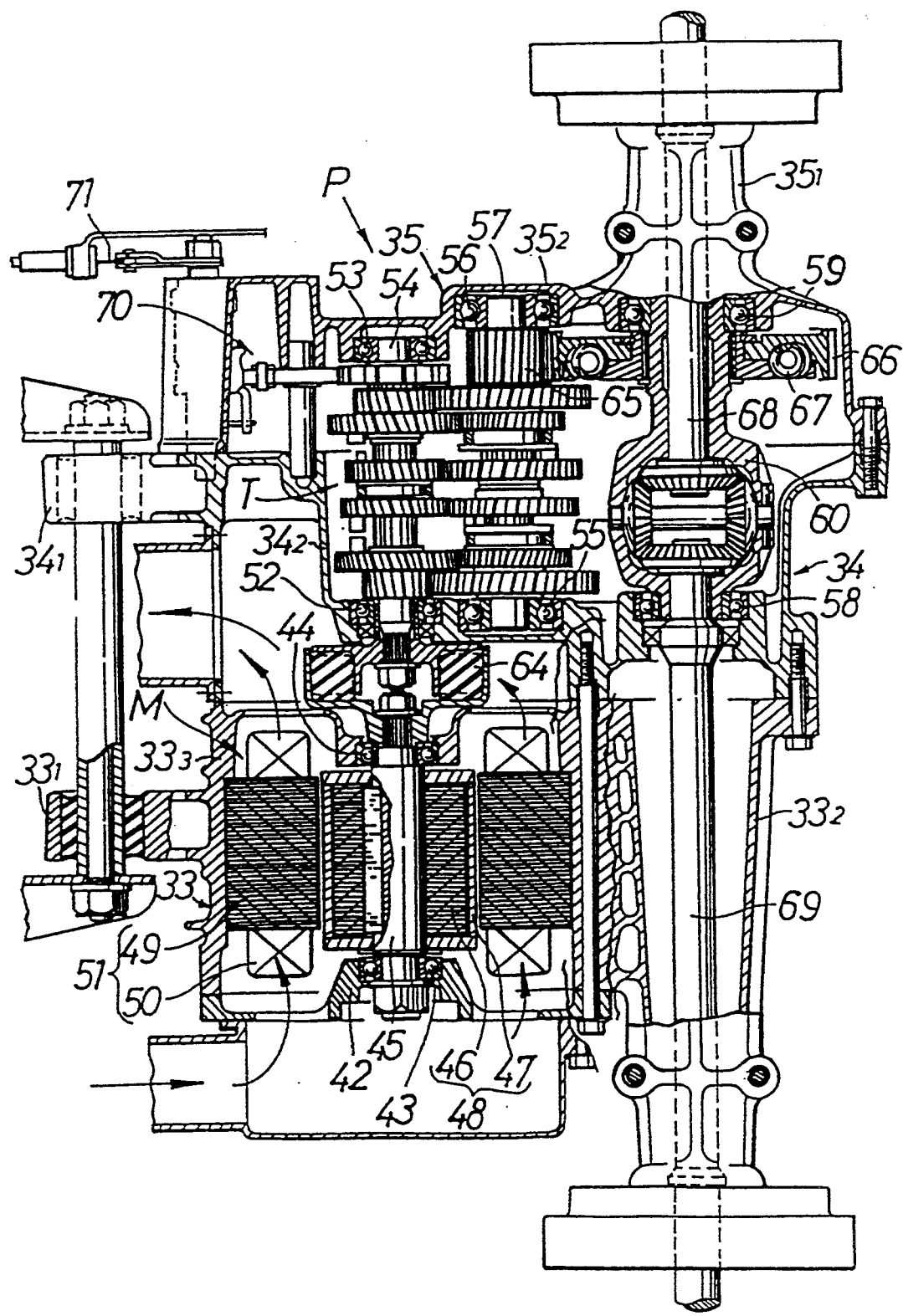
FIG. 4 is a sectional view taken along the line 4—4 of FIG. 2.

As shown in FIG. 2, a battery supporting frame 22 is hung inside the first rear vehicular frame 6 through a plurality of rubber dampers 21. A battery box main body 23 is fitted and supported on the battery supporting frame 22, and the upper surface of the battery box main body 23 is covered with a battery box cover 24. Batteries for driving a drive motor M, as illustrated in FIG. 4, are provided on the power unit P and are mounted inside the battery box main body 23. In addition, an electronic control unit, a field effect transistor (hereinafter referred to as an FET) driver and a battery charger and the like are mounted inside the battery box cover 24.

An electric fan 25 is disposed on the front portion of the battery box main body 23. The cooling air sucked from the outside by the electric fan is first introduced inside the battery box main body 24 to cool the electronic control unit, FET driver and battery charger and the like, and is then introduced inside the power unit P through a flexible duct 26 to cool the drive motor M. The cooling air increased in temperature by cooling the drive motor M is introduced inside the battery box main body 23 through the flexible duct 27 to heat the battery, and is then discharged to the outside.

Figure 3:
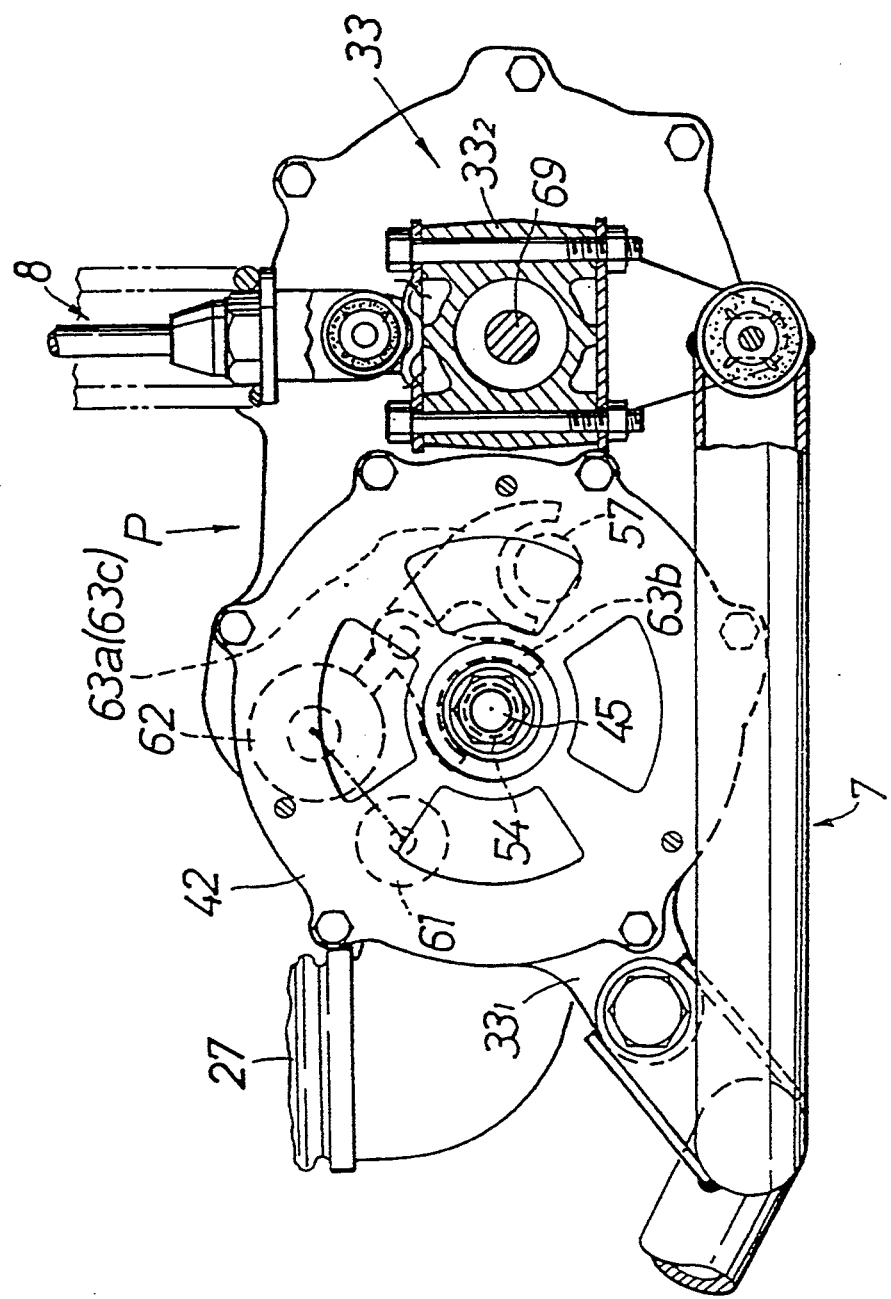
FIG. 3 is an enlarged view showing the main portion of FIG. 2.

The construction of the power unit P will next be described with reference to FIGS. 3 and 4. The power unit P includes a casing which is divided by two vertical division surfaces extending in the longitudinal direction of the vehicular body into three casings, that is, a left side casing 33, a central casing 34 and a right side casing 35.

The three casings 33, 34 and 35 are integrally connected with each other to constitute one block. The left casing 33 integrally includes a drive motor case $33_3$ between a bracket $33_1$ and a left axle case $33_2$. The central casing 34 includes a left transmission case $34_2$ covering the left half of a transmission T on the rear portion of the bracket $34_1$. The right casing 35 includes a right transmission case $35_2$ covering the right half of the transmission T on the rear portion of a right axle case $35_1$.

The drive motor M disposed inside the drive motor case $33_3$ of the left casing 33 comprises a D.C. brushless motor, which includes a ball bearing 43 provided on a cover 42 covering the opening portion at the left end of the drive motor case $33_3$, and a rotational shaft 45 supported by a ball bearing 44 provided on the right wall of the drive motor case $33_3$. The rotational shaft 45 includes a rotator 48 having a permanent magnet 47 disposed around the outer periphery of an iron core 46. A stator 51 includes an iron core 49 having a coil 50 wound therearound. The stator 51 is supported around the rotator 48.

A main shaft 54 is supported by a pair of ball bearings 52 and 53, between the left transmission case $34_2$ of the central casing 34 and the right transmission case $35_2$ of the right casing 35. A counter shaft 57 is supported by a pair of ball bearings 55 and 56, and a differential case 60 is supported by a pair of bearings 58 and 59 in parallel therewith. A plurality of gear trains of the transmission T are supported by the main shaft 54 and the counter shaft 57. Shift forks $63a$ to $63c$ are supported by a shift drum 62 rotated by a change motor 61 and are engaged with the above gear trains, to thereby establish the desired speed change step at the transmission T, as illustrated in FIG. 3.

The rotational shaft 45 of the drive motor M and the main shaft 54 are disposed coaxially with each other, wherein the opposed ends thereof are connected with each other by means of a rubber coupling 64. A damper 67 for absorbing the shock in shifting is provided on a final driven gear 66 which is provided on the right end of the differential case 60 and meshed with a final drive gear 65 of the counter shaft 57. Thus, the drive force of the drive motor M is transmitted from the main shaft 54 to the differential case 60 through the counter shaft 57, and is further transmitted to the left and right axle shafts 68 and 69.

In addition, as illustrated in FIG. 4, a parking braking mechanism 70 is provided for locking the main shaft 54 by operation of a Bowden wire 71.

Figure 5:
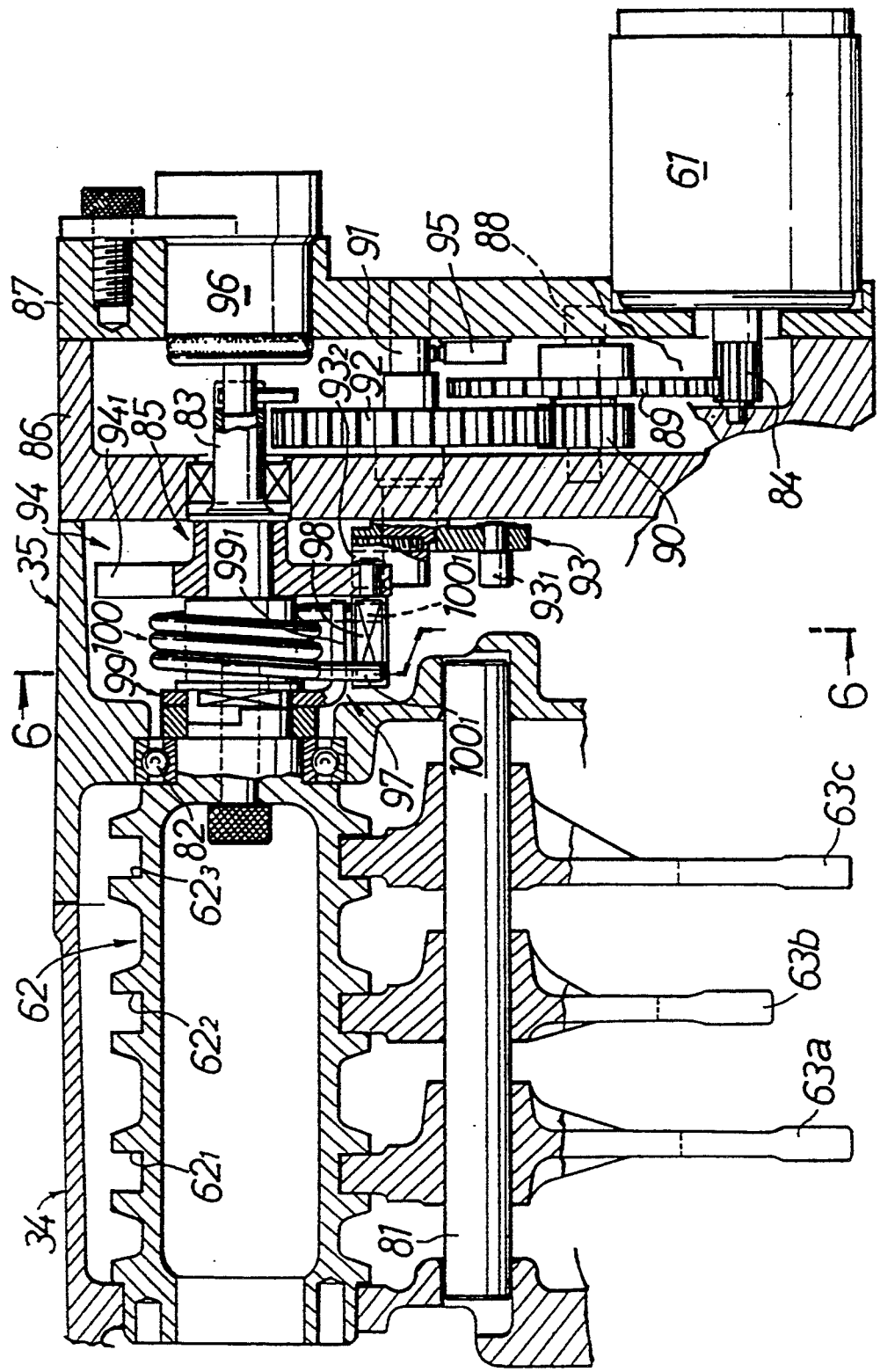
FIG. 5 is an enlarged sectional view of a speed change gear.

Next, the construction of the speed change gear will be described with reference to FIGS. 5 and 6. A shift fork shaft 81 and a shift drum 62 are supported on the upper portion of the transmission T. Three of the shift forks $63a$, $63b$ and $63c$, are axially slidably supported on the shift fork shaft 81 and are connected with the gear trains. The shift forks $63a$, $63b$ and $63c$ are respectively engaged with three of the cam grooves $62_1$, $62_2$ to $62_3$ formed around the outer periphery of the shift drum 62 to provide a driving force thereto.

A shift drum shaft 83 extends from one end of the shift drum 62 and is supported by the ball bearing 82 for being intermittently rotated by means of the drive force of the change motor 61 through a Geneva stop mechanism 85. Namely, the drive force of the change motor 61, supported outside gear housings 86 and 87, which is provided on the rear and left side surface of the right casing 35 is transmitted from a pinion 84 formed on the output shaft of the change motor 61 to a gear 92 of a second intermediate shaft 91 through gears 89 and 90 supported by a first intermediate shaft 88. The Geneva stop mechanism 85 includes a drive rotor 93 rigidly fixed at the end portion of the second intermediate shaft 91 and a driven rotor 94 relatively rotatably supported by the shift drum shaft 83.

The drive rotor 93 includes a pin $93_1$ eccentrically positioned from the second intermediate shaft 91 and a circular arc positioning projecting portion $93_2$ formed on the side opposed to the pin $93_1$. On the other hand, the driven rotor 94 includes five grooves $94_1$ radially extending at an interval of 60° and engaged with the pin $93_1$. In addition, the driven rotor 94 includes six circular arc positioning recessed portions $94_2$ formed around the outer periphery of the grooves 94, at an interval of 60° and engaged with the positioning projecting portion $93_2$. The gear housing 87 is provided with a limit switch 95 for detecting the rotational position of the second intermediate shaft 91, that is, the specified rotational position of the drive rotor 93 of the Geneva stop mechanism 85. Also, a rotary encoder 96 is provided for detecting the rotational position of the shift drum 62, that is, the shift position at the end portion of the shift drum shaft 83.

The rotation of the driven rotor 94 relatively rotatably supported by the shift drum shaft 83 is transmitted to the shift drum shaft 83 through a lost motion mechanism 97. The lost motion mechanism 97 includes a pin 98 mounted on a portion having no groove $94_1$ of the driven rotor 94. A driven member 99 having a projection $99_1$ is rigidly fixed on the shift drum shaft 83 and extends inside the pin 98 in parallel thereto. A coil spring 100, having a pair of engagement portions $100_1$ is wound around the shift drum shaft 83 for holding the pin 98 and the projection $99_1$ of the driven member 99 at both ends thereof.

Figure 7:
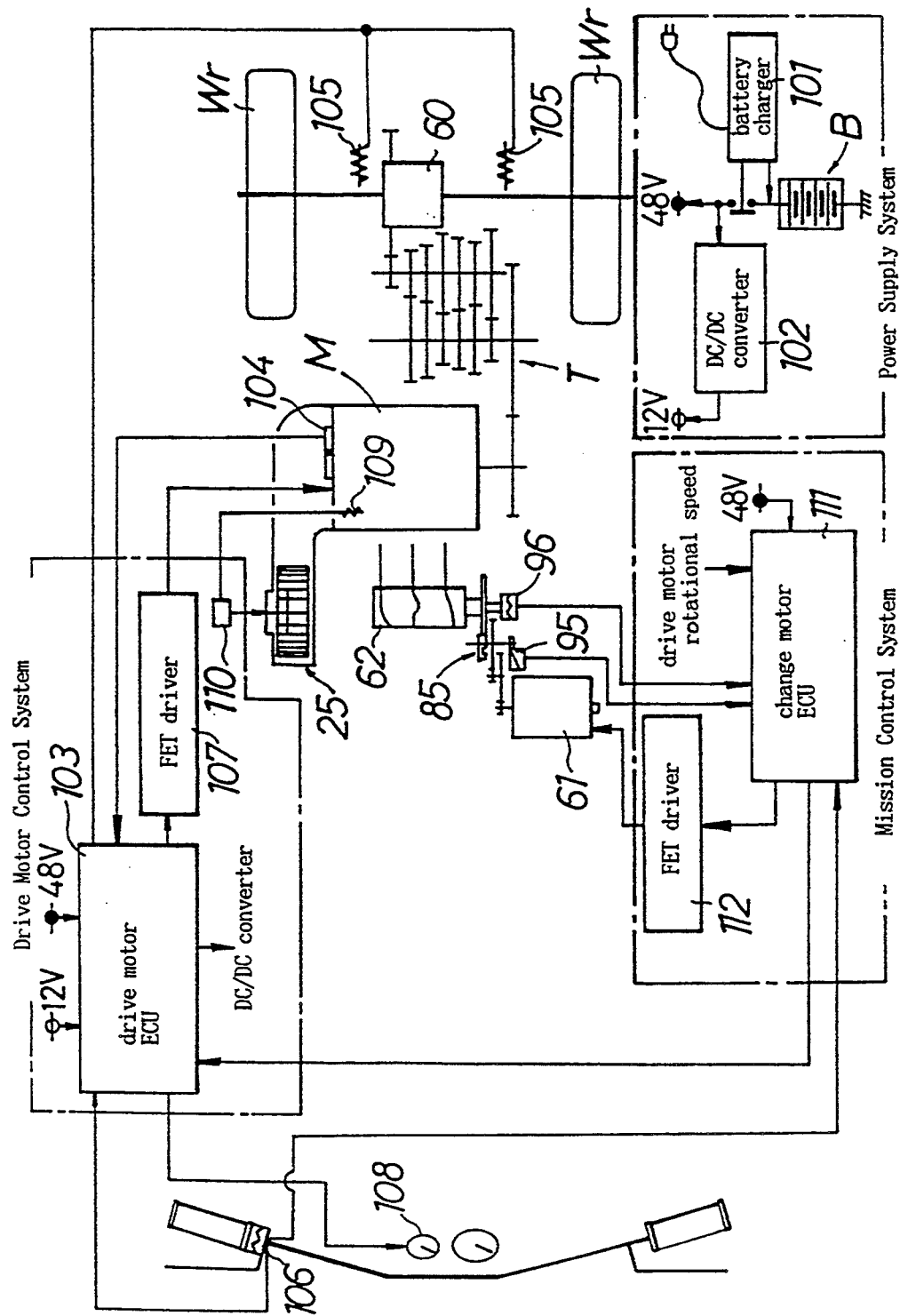
FIG. 7 is a block diagram of a control system.

Next, a controller including a power supply system, drive motor control system and a mission control system will be described with reference to FIG. 7. The power supply system of the controller includes a plurality of batteries B mounted inside the battery box main body 23, a battery charger 101 for charging the batteries B, and a DC/DC converter 102 for reducing an output voltage of each battery B from 48 V to 12 V. The battery charger 101 includes a plug connected to an external domestic AC power supply. The power supply circuit extending from the batteries B is cut-off during charging by the battery charger 101.

The drive motor control system includes a drive motor electronic control unit 103. The drive motor electronic control unit 103 receives signals from a drive motor rotational speed sensor 104 for detecting the rotational speed of the drive motor M. A rear wheel rotational speed sensor 105 is provided for detecting the rotational speed of the right and left rear wheels Wr. An accelerator opening sensor 106 is provided for detecting the rotational angle of an accelerator grip, and a change motor electronic control unit described later. The drive motor electronic control unit 103 controls the drive of the drive motor M through an FET driver 107 and outputs the signals to the DC/DC converter 102 and a battery residual capacity meter 108 to operate the DC/DC converter 102 and the battery residual capacity meter. Further, the drive motor electronic control unit 103 is provided with a temperature switch 110, which is operated by the output from a drive motor temperature sensor 109 for detecting the temperature of the drive motor M and operates the electric fan 25 when the temperature of the drive motor M exceeds the specified value.

The change motor electronic control unit 111 of a transmission control system receives signals from the drive motor electronic control unit 103, an accelerator opening sensor 106, the rotary encoder 96 for detecting the position of the shift drum 62, and the limit switch 95 for detecting the position of the drive rotor 93 of the Geneva stop mechanism 85. The change motor electronic control unit 111 controls the drive of the change motor 61 through the FET driver 112.

Next, the function of the embodiment according to the present invention having the above construction will be described. As the drive motor M of the power unit P is driven by the electric power supplied by the batteries B, the rotation of the rotational shaft 45 is transmitted to the main shaft 54 of the transmission T through the rubber coupling 64. The rotation of the main shaft 54 is reduced by the gear trains of the specified speed gear step to be transmitted to the counter shaft 57, and is then further transmitted to the right and left rear wheels Wr through the final drive gear 65, damper 67, final driven gear 66 and differential case 60.

Figure 6:
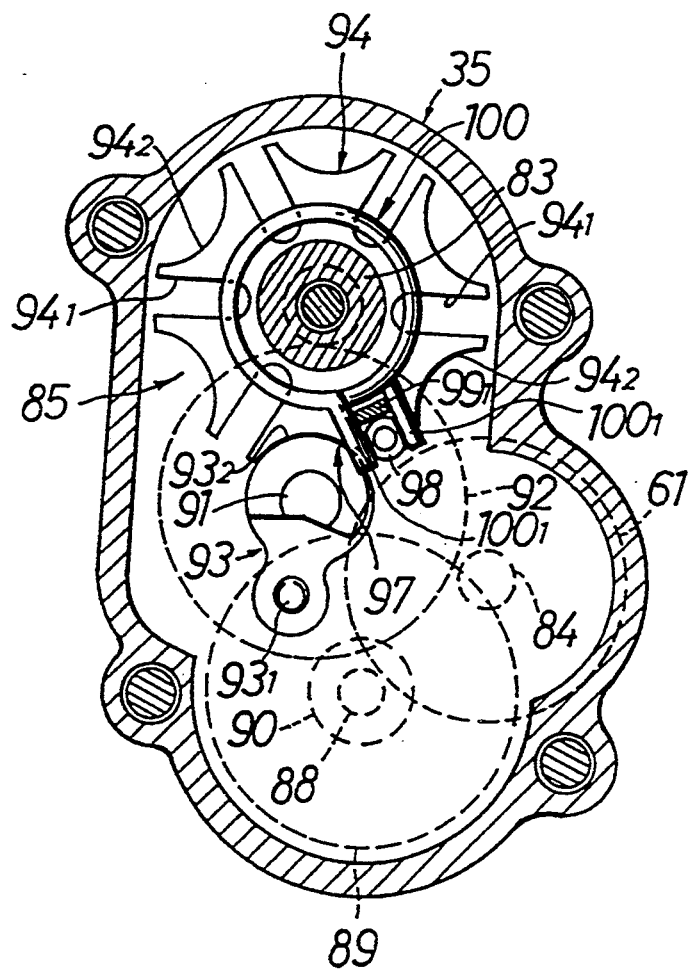
FIG. 6 is sectional view taken along the line 6—6 of FIG. 5.

When the shift change is not performed, as shown in FIG. 6, the positioning projection $93_2$ of the drive rotor 93 of the Geneva mechanism 85 is engaged with any one of the positioning recessed portions $94_2$ of the driven rotor 94, so that the driven rotor 94 is in the state of being positioned at the specified position. Accordingly, the projection $99_1$ of the lost motion mechanism 97 fixed at the shift drum shaft 83 is held by the locking portion $100_1$ at both ends of the coil spring 100 to be positioned at the same position with respect to the pin 98 of the driven rotor 94. Accordingly the shift drum 62 is also positioned at the stop position corresponding to that of the above driven rotor 94.

Upon operation of the cycle vehicle, for example, when the drive motor electronic control unit 103 transmits a speed change signal of shift-up, the change motor 61 is driven through the change motor electronic control unit 111 and the FET driver 112. The drive motor electronic control unit 103 functions as a speed change signal outputting means. By the rotation of the change motor 61, the pin $93_1$ of the drive rotor 93 reaches the position as shown in FIG. 8(A) and the shift change is started, and concurrently the limit switch 95 is operated. As the signal of the limit switch 95 is transmitted to the drive motor electronic control unit 103 through the change motor electronic control unit 111, the drive motor electronic control unit 103 reduces the current supplied to the drive motor M through the FET driver 107. The drive motor electronic control unit 103 functions as an output reducing means for reducing an output of the drive motor M. Consequently, the meshing surface pressure of the gear trains of the speed change step presently established at the transmission T is instantly dissipated, and during the above period thereof, the new speed change step is smoothly established by rotation of the shift drum 62.

Figure 8:
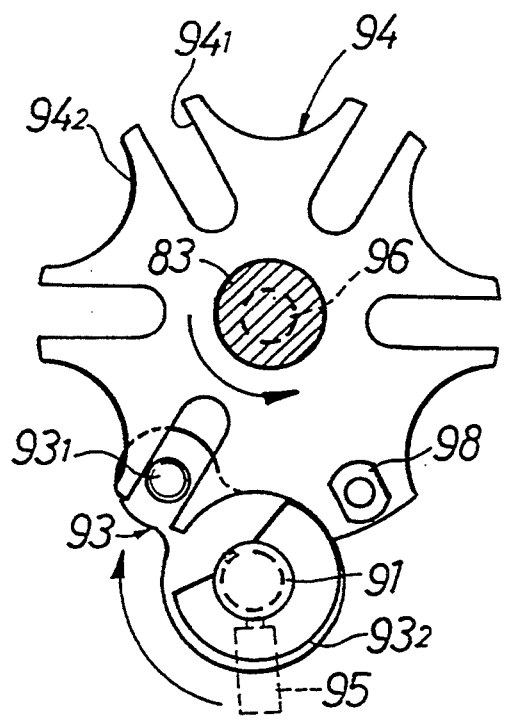
FIGS. 8(A) and 8(B) are explanatory views of the movement of the cam follower.
Figure 8:
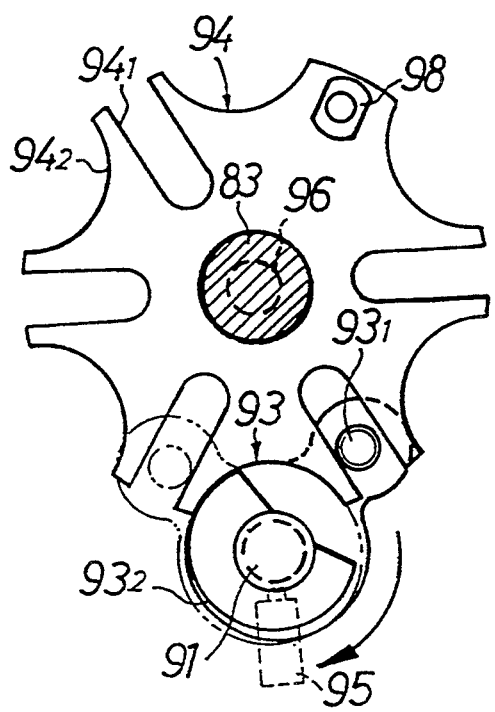

When the drive rotor 93 is rotated in the direction of the arrow from the position as shown in FIG. 8 (A), the pin $93_1$ is engaged with one of the grooves $94_1$ of the driven rotor 94 to rotate the driven rotor 94 in the direction of the shift-up by 60°. Thus, as the driven rotor 94 of the Geneva mechanism 85 is rotated by 60°, the motion of the pin 98 is transmitted to the projection $99_1$ of the driven member 99 through the coil spring 100, so that the shift drum 62 is rotated by 60° and is stopped at the new shift position. By the rotation of the shift drum 62, the shift forks 63a to 63c respectively engaged with the cam grooves $62_1$ to $62_3$ are moved along the shift fork shaft 81, to thereby establish the new speed change step of the transmission T.

When the rotary encoder 96 connected with the shift drum 83 detects the above completion of the shift-up, the signal thereof is transmitted to the drive motor electronic control unit 103 through the change motor electronic control unit 111, so that the drive motor electronic control unit 103 smoothly increases the current supplied to the drive motor M for suppressing the speed change shock at a minimum through the FET driver 107. The drive motor electronic control unit 103 functions as an output increasing means for increasing the output of the drive motor M. Also, when the limit switch 95 detects that the drive rotor 93 reaches the position as shown in FIG. 8(B), the change motor electronic control unit 111 stops the current supplied to the change motor 61 through the FET driver 112.

Figure 9:
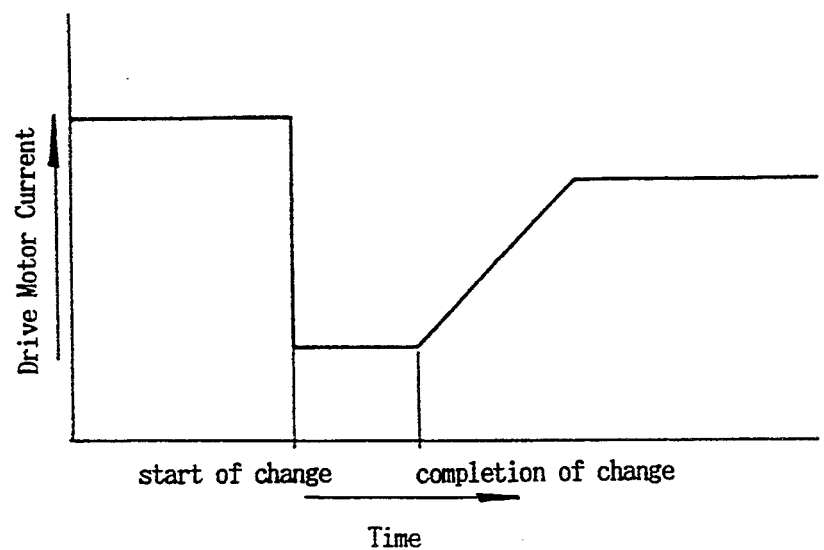
FIG. 9 is a graph showing a current change in the drive motor at the time of shift change.

FIG. 9 shows the change of the current supplied to the drive motor M in the above shift change process. As shown in FIG. 9, the current supplied to the drive motor M is rapidly increased at the same time when the shift change by the limit switch 95 is started. The above current is gradually increased at the same time when the completion of the shift change by the rotary encoder 96 is detected. Then, the current after completion of the shift change is set to be lower than the current before the starting of the shift change so that the outputs of the drive motor M are equal to each other before and after the shift change.

In the case wherein the above shift change is not smoothly performed for any reason and the shift forks 63a to 63c and the shift drum 62 are instantly stopped, the change motor 61 is prevented from being applied with the excessive load by the action of the lost motion mechanism 97 provided between the shift drum 62 and the Geneva mechanism 85. Namely, when the pin 98 provided on the driven rotor 94 of the Geneva stop mechanism 85 is rotated in the state where the driven member 99 integrated with the shift drum 62 is temporarily stopped, the pin 98 is rotated relative to the projection $99_1$ of the driven member 99 to thereby elastically deform a pair of the locking portions $100_1$ of the coil spring 100 so as to be spaced from each other. As a result, even if the shift drum is stopped, the change motor 61 can be rotated, which makes it possible to prevent the change motor 61 from being applied with an excessive load. Since the stopped shift drum 62 is applied with the elastic force through the coil spring 100, when the stopping is released, the shift drum 62 is rotated to the specified position by the elastic force of the coil spring 100, to thereby establish the desired speed change step.

Even if the shift drum 62 driven by the change motor 61 is temporarily stopped as described above, by the action of the lost motion mechanism 97 interposed between the Geneva stop mechanism 85 and the shift drum 62, the change motor 61 is prevented from being applied with the excessive load and the shift change can be smoothly performed. Further, in the above shift change process, the speed change shock is absorbed by the action of the rubber coupling 64 provided between the rotational shaft 45 of the drive motor M and the main shaft 54 of the transmission T and of the damper 67 provided on the main shaft 54 of the transmission T.

The shift-down operation is made in the same manner as the above shift-up operation. Namely, the change motor 61 is rotated in the direction reversed to that described above on the basis of the speed change signal of the shift-down transmitted by the drive motor electronic control unit 103. Then, when the drive rotor 93 reaches from the position as shown in FIG. 6 to the position as shown in FIG. 8(B), the current supplied to the drive motor M is decreased, while the shift drum 62 is rotated through the Geneva stop mechanism 85, thus establishing the new speed change step at the transmission T. After completion of the shift-down, the current supply to the drive motor M is smoothly increased, and when the drive rotor 93 reaches the position as shown in FIG. 8(A), the current supply to the change motor 61 is stopped.

Figure 10:
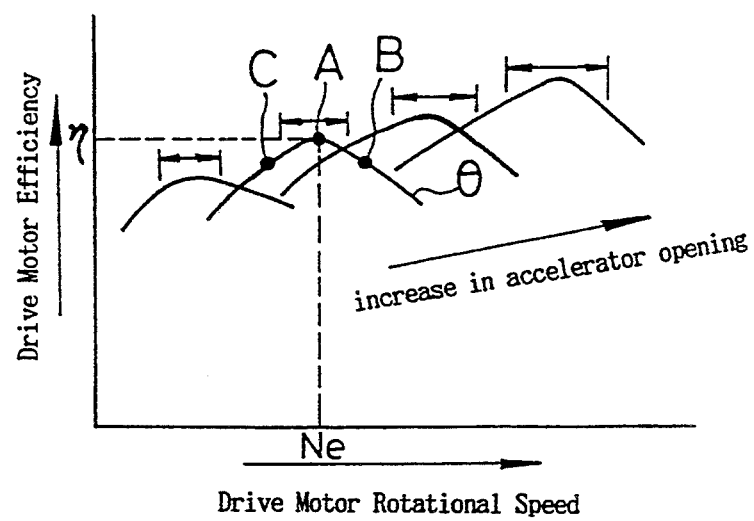
FIG. 10 is a graph showing the relationship between the rotational speed of the drive motor and the efficiency.

The process wherein the drive motor electronic control unit 103 outputs the speed change signal of the shift-up or shift-down, that is used to select the new speed change step, is hereinafter described. FIG. 10 shows the relationship between a rotational number of the drive motor M detected by the drive motor rotational speed sensor 104 and an efficiency of the drive motor M with respect to various accelerator openings detected by the accelerator opening sensor 106. For example, when the accelerator opening is to be $\Theta$ and the rotational speed of the drive motor M is Ne, the drive motor M is operated at the maximum efficiency $\eta$ at the accelerator opening $\Theta$, as illustrated as point A. However, when the rotational speed of the drive motor M exceeds the above value of Ne at the accelerator opening $\Theta$, the efficiency of the drive motor M is less than the value of $\eta$, as illustrated as point B. In this case, the rotational speed of the drive motor M is reduced by increasing the load through the shift-up, which makes it possible to hold the above efficiency $\eta$. On the other hand, if the accelerator opening is to be $\Theta$ and the rotational speed of the drive motor M is less than Ne, the efficiency of the drive motor M is less than the above value of $\eta$, as illustrated as point C. In this case, the rotational speed of the drive motor M is increased by reducing the load through the shift-down, which makes it possible to hold the above efficiency $\eta$.

Thus, the target rotational speed for obtaining the maximum efficiency of the drive motor M at each accelerator opening is obtained by the map retrieval, and in the case where the actual rotational speed of the drive motor M is deviated from the above target rotational speed by a specified amount, the speed change signal of shift-up or shift-down is outputted.

It is possible to operate the drive motor M in a high efficiency range as shown by the arrow in FIG. 10 for each accelerator opening, and to reduce the consumption power of the batteries B for prolonging the distance of operation of the vehicle.

Figure 11:
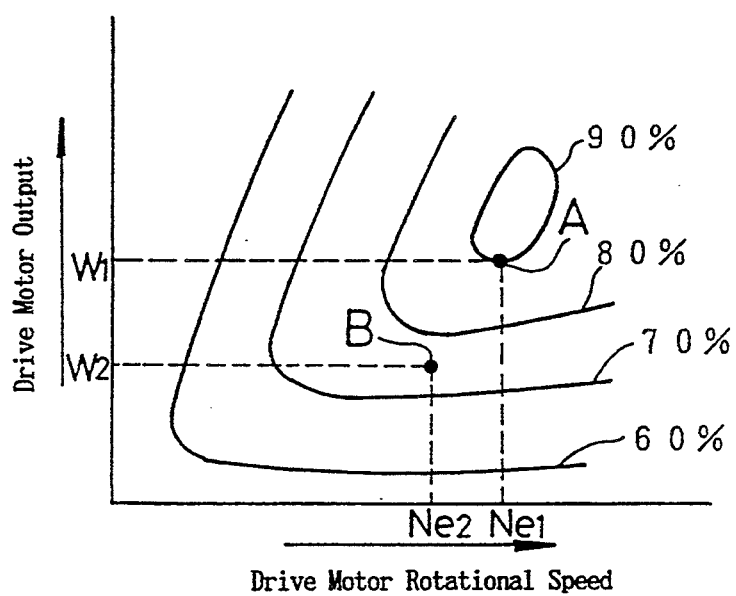
FIG. 11 is a graph showing the relationship between the rotational speed of the drive motor and the output.

FIG. 11 shows the change of the efficiency of the drive motor M depending on the rotational speed and the output of the drive motor M for the specified accelerator opening. For example, when the output $W_1$ of the drive motor M is required, if the rotational speed of the drive motor M is $Ne_1$, it is possible to obtain the possible maximum efficiency 90%, as illustrated by the point A. Accordingly, when the rotational speed exceeds the above value of $Ne_1$, a shift-up is made, and when the speed is less than the value of $Ne_1$, a shift-down is made. Thus it is possible to converge the rotational speed of the drive motor M to the above $Ne_1$ and to enhance the efficiency. Similarly, when the output $W_2$ of the drive motor M is required, by performing the shift change in such a manner that the rotational speed of the drive motor M is $Ne_2$, it is possible to obtain a possible maximum efficiency of 75%, as illustrated by point B.

As described above, an embodiment of the present invention has been described. However, the present invention is not limited to the above embodiment, and various modification in design are possible.

For example, in the described embodiment, the output of the drive motor M is reduced in the shift change. However, it may be stopped. Also, in the embodiment, the vehicle using an electric motor as a running drive source is shown; however, the present invention may be applied the vehicle using an internal combustion engine as a running drive source. In this case, the reduction and the stoppage in the output of the running drive source can be achieved by the ignition retard control and the off-control of the clutch. Further, it is possible to output the speed change signal for starting the shift change by a manual switch. Further, in place of detecting whether or not the drive rotor 95 reaches the position as shown in FIGS. 8(A) or 8(B) by one limit switch 95, it is possible to detect the position by two limit switches.

As described above, according to the present invention, by reducing or stopping the output of the running drive source on the basis of the speed change signal, the meshing surface pressure of the gear trains of the transmission is temporarily released, and during the period thereof, the speed change of the transmission is performed by the actuator, and after completion of the speed change, the output of the running drive source is increased again. Accordingly, it is possible to smoothly perform the shift change by the actuator with a simple structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed change controller for a vehicle for transmitting an output of a running drive source to drive wheels through a transmission, comprising:

speed change signal outputting means for outputting a speed change signal;

output reducing means for reducing an output of said running drive source on a basis of said speed change signal;

an actuator for speed-changing said transmission during reducing said output of said running drive source; and an output increasing means for increasing said output of said running drive source after completion of said speed change.

2. The speed change controller for a vehicle according to claim 1, and further including a drive source rotational speed sensor for detecting the rotational speed of the drive source and for producing a signal supplied to said speed change signal outputting means.

3. The speed change controller for a vehicle according to claim 1, and further including an accelerator opening sensor for detecting the rotational angle of an accelerator grip and for producing a signal supplied to said speed change controller.

4. The speed change controller for a vehicle according to claim 1, wherein said actuator includes a shift drum connected to said transmission for smoothly effecting a speed change.

5. The speed change controller for a vehicle according to claim 4, and further including a rotary encoder for detecting the position of the shift drum and for producing a signal supplied to said speed change controller.

6. The speed change controller for a vehicle according to claim 1, wherein said actuator includes a drive rotor connected to said shift drum for smoothly effecting a speed change.

7. The speed change controller for a vehicle according to claim 6, and further including a limit switch for detecting the position of the drive rotor and for producing a signal supplied to said speed change controller.

8. The speed change controller for a vehicle according to claim 6, and further including a Geneva stop mechanism connected to said drive rotor and said shift drum for selectively transmitting motion therebetween.

9. The speed change controller for a vehicle according to claim 8, and further including a positioning projection connected to said drive rotor, said positioning projection being engaged with a positioning recess portion of said Geneva stop mechanism during a condition when a shift change does not occur.

10. The speed change controller for a vehicle according to claim 9, and further including a lost motion mechanism connected to a shift drum shaft, said lost motion mechanism including a coil spring for engaging a pin connected to said Geneva stop mechanism.

11. The speed change controller for a vehicle according to claim 8, and further including a projection connected to said drive rotor, said projection being engaged within a groove in said Geneva stop mechanism for imparting movement to said Geneva stop mechanism and said shift drum during a condition when a shift change occurs.

12. A speed change controller for a vehicle for transmitting an output of a running drive source to drive wheels through a transmission, comprising:

speed change signal outputting means for outputting a speed change signal;

output reducing means for stopping an output of said running drive source on a basis of said speed change signal;

an actuator for speed-changing said transmission during a stopping of said output of said running drive source; and an output increasing means for increasing said output of said running drive source after completion of said speed change.

13. The speed change controller for a vehicle according to claim 12, and further including a drive source rotational speed sensor for detecting the rotational speed of the drive source and for producing a signal supplied to said speed change signal outputting means.

14. The speed change controller for a vehicle according to claim 12, and further including an accelerator opening sensor for detecting the rotational angle of an accelerator grip and for producing a signal supplied to said speed change controller.

15. The speed change controller for a vehicle according to claim 12, wherein said actuator includes a shift drum connected to said transmission for smoothly effecting a speed change.

16. The speed change controller for a vehicle according to claim 15, and further including a rotary encoder for detecting the position of the shift drum and for producing a signal supplied to said speed change controller.

17. The speed change controller for a vehicle according to claim 12, wherein said actuator includes a drive rotor connected to said shift drum for smoothly effecting a speed change.

18. The speed change controller for a vehicle according to claim 17, and further including a limit switch for detecting the position of the drive rotor and for producing a signal supplied to said speed change controller.

19. The speed change controller for a vehicle according to claim 17, and further including a Geneva stop mechanism connected to said drive rotor and said shift drum for selectively transmitting motion therebetween.

20. The speed change controller for a vehicle according to claim 19, and further including a positioning projection connected to said drive rotor, said positioning projection being engaged with a positioning recess portion of said Geneva stop mechanism during a condition when a shift change does not occur.

21. The speed change controller for a vehicle according to claim 20, and further including a lost motion mechanism connected to a shift drum shaft, said lost motion mechanism including a coil spring for engaging a pin connected to said Geneva stop mechanism.

22. The speed change controller for a vehicle according to claim 19, and further including a projection connected to said drive rotor, said projection being engaged within a groove in said Geneva stop mechanism for imparting movement to said Geneva stop mechanism and said shift drum during a condition when a shift change occurs.

* * * * *